(12) United States Patent
Xu et al.

(10) Patent No.: US 10,244,261 B2
(45) Date of Patent: Mar. 26, 2019

(54) TRANSFORM COEFFICIENT CODING USING LEVEL MAPS

(71) Applicant: GOOGLE INC., Mountain View, CA (US)

(72) Inventors: Yaowu Xu, Saratoga, CA (US); Jingning Han, Santa Clara, CA (US); Ching-Han Chiang, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 169 days.

(21) Appl. No.: 15/415,974

(22) Filed: Jan. 26, 2017

(65) Prior Publication Data

US 2018/0213258 A1 Jul. 26, 2018

(51) Int. Cl.
*H04N 19/129* (2014.01)
*H04N 19/60* (2014.01)
(Continued)

(52) U.S. Cl.
CPC ......... *H04N 19/60* (2014.11); *G06K 9/00362* (2013.01); *G06K 9/00624* (2013.01); *G06K 9/00711* (2013.01); *G06K 9/00771* (2013.01); *G06K 9/00778* (2013.01); *G08B 13/19602* (2013.01); *G08B 13/19604* (2013.01); *H04N 5/23238* (2013.01); *H04N 19/129* (2014.11); *H04N 19/13* (2014.11); *H04N 19/157* (2014.11); *H04N 19/18* (2014.11);
(Continued)

(58) Field of Classification Search
CPC ...... H04N 19/129; H04N 19/18; H04N 19/48; H04N 19/60; H04N 19/645
See application file for complete search history.

(56) References Cited

U.S. PATENT DOCUMENTS

| 4,447,886 A | 5/1984 | Meeker |
| 2007/0019876 A1 | 1/2007 | Cai et al. |

(Continued)

OTHER PUBLICATIONS

Sze et al., "High Throughput CABAC Entropy Coding in HEVC", IEEE Transactions on Circuits and Systems for Video Technology, vol. 22, No. 12 (pp. 1778-1791) Dec. 2012 (Year: 2012).*

(Continued)

*Primary Examiner* — Robert J Hance
(74) *Attorney, Agent, or Firm* — Young Basile Hanlon & MacFarlane, P.C.

(57) ABSTRACT

A method for encoding a transform block in an encoded video bitstream is provided. The method includes encoding a non-zero map indicating positions of the transform block containing non-zero transform coefficients, encoding a respective lower-range level map, and encoding a coefficient residual map. A lower-range level map indicates which values of the non-zero transform coefficients are equal to and which are greater than the map level. Each residual coefficient of the coefficient residual map corresponds to a respective non-zero transform coefficient of the transform block having an absolute value exceeding the maximum map level. An apparatus including a processor and a memory for decoding a transform block is also provided. The memory includes instructions executable by the processor to decode, a non-zero map, decode lower-range level maps up to a maximum map level, and decode a coefficient residual map.

15 Claims, 11 Drawing Sheets

(51) Int. Cl.
| | |
|---|---|
| *H04N 19/44* | (2014.01) |
| *H04N 19/18* | (2014.01) |
| *H04N 19/88* | (2014.01) |
| *G06K 9/00* | (2006.01) |
| *G08B 13/196* | (2006.01) |
| *H04N 5/232* | (2006.01) |
| *H04N 19/48* | (2014.01) |
| *H04N 19/645* | (2014.01) |
| *H04N 19/70* | (2014.01) |
| *H04N 19/13* | (2014.01) |
| *H04N 19/91* | (2014.01) |
| *H04N 19/157* | (2014.01) |

(52) U.S. Cl.
CPC ............ *H04N 19/44* (2014.11); *H04N 19/48* (2014.11); *H04N 19/645* (2014.11); *H04N 19/70* (2014.11); *H04N 19/88* (2014.11); *H04N 19/91* (2014.11)

(56) References Cited

U.S. PATENT DOCUMENTS

| | | | | |
|---|---|---|---|---|
| 2009/0201986 | A1* | 8/2009 | Schwarz | H03M 7/4006 375/240.02 |
| 2012/0170857 | A1* | 7/2012 | He | H04N 19/50 382/233 |
| 2012/0230417 | A1* | 9/2012 | Sole Rojals | H04N 19/176 375/240.18 |
| 2013/0016789 | A1* | 1/2013 | Lou | H04N 19/176 375/240.18 |
| 2013/0027230 | A1* | 1/2013 | Marpe | H03M 7/4006 341/107 |
| 2013/0051475 | A1* | 2/2013 | Joshi | H04N 19/159 375/240.18 |
| 2013/0188725 | A1* | 7/2013 | Wang | H04N 19/176 375/240.18 |
| 2013/0188735 | A1* | 7/2013 | Nguyen | H04N 19/176 375/240.25 |
| 2014/0286417 | A1* | 9/2014 | Gamei | H03M 7/4018 375/240.12 |

OTHER PUBLICATIONS

International Search Report and Written Opinion dated Feb. 2, 2018 for International Patent Application No. PCT/US2017/059246.
Sole et al, "Transform Coefficient Coding in HEVC"; IEEE Transactions on Circuits and Systems for Video Technology, Institue of Electrical and Electronics Engineers, vol. 22, No. 12; Dec. 1, 2012 pp. 1765-1777.
Nguyen et al; "Entropy Coding of Syntax Elements Related to Block Structures and Transform Coefficient Levels in HEVC"; Proceedings of Spie; vol. 8499, Oct. 25, 2012; p. 1-12.
Hsiang et al; "Non-CE3: Modified Method for Coding Transform Coefficient Level"; MPEG Meeting; Apr. 28, 2012; pp. 1-8.
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
Li, Jiana et al. "Lossless Image Compression with Tree Coding of Magnitude Levels", Media Communication Group, Microsoft Research Asia, Beijing, China; IEEE 2005, pp. 1-4.

* cited by examiner

TRANSFORM COEFFICIENT CODING USING LEVEL MAPS

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding based on motion estimation and compensation may be performed by breaking frames or images into blocks which are predicted based on one or more prediction blocks of reference frames. Differences (i.e., residual errors) between blocks and prediction blocks are transformed frequency domain transform coefficients. The transform coefficients are compressed and encoded in a bitstream using context models. A decoder uses the encoded transform coefficients and the reference frames to reconstruct the frames or images.

SUMMARY

The disclosure relates in general to video coding, and in particular to transform coefficient coding using level maps.

One aspect of the disclosed implementations is a method for encoding a transform block in an encoded video bitstream. The method includes encoding a non-zero map indicating positions of the transform block containing non-zero transform coefficients, encoding a respective lower-range level map, and encoding a coefficient residual map. Each lower-range level map has a respective map level up to a maximum map level. A lower-range level map indicates which values of the non-zero transform coefficients are equal to the map level of the lower range map and which values of the non-zero transform coefficients are greater than the map level. Each residual coefficient of the coefficient residual map corresponds to a respective non-zero transform coefficient of the transform block having an absolute value exceeding the maximum map level.

An apparatus for decoding a transform block from an encoded video bitstream according to one implementation of this disclosure includes a processor and a memory. The memory includes instructions executable by the processor to decode, from the encoded video bitstream, a non-zero map, decode a respective lower-range level map having a respective map level up to a maximum map level, and decode a coefficient residual map. The non-zero map indicates which transform coefficients of a transform block have a zero value and which transform coefficients of the transform block have a non-zero value. The respective lower-range level map indicates which transform coefficients of the transform block are equal to the respective map level and which transform coefficients of the transform block are greater than the respective map level. Each residual coefficient of the coefficient residual map corresponds to a respective transform coefficient of the transform block having an absolute value that exceeds the maximum map level.

Another method for decoding a transform block from an encoded video bitstream includes re-composing transform coefficients of the transform block from binary level maps arranged in a tier and a residual transform map reconstructed from the encoded video bitstream, the binary level maps formed by breaking down a value of a respective transform coefficient into a series of binary decisions, each binary decision corresponding to a magnitude level of the respective transform coefficient at a map level of a respective tier, and the residual transform map including values of the respective transform coefficients exceeding a cardinality of the binary level maps.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

As mentioned above, motion vector residuals for a block of video are transformed into transform blocks of transform coefficients. The transform blocks are in the frequency domain and one or more transform blocks may be generated for a block of video. The transform coefficients are quantized and entropy coded into an encoded video bitstream. A decoder uses the encoded transform coefficients and the reference frames to reconstruct the block. Entropy coding a transform coefficient involves the selection of a context model (also referred to as probability context model or probability model) which provides estimates of conditional probabilities for coding the binary symbols of a binarized transform coefficient.

When entropy coding a transform coefficient, some video coding systems use previously coded transform coefficients of the transform block as the context for selecting a context model. The magnitudes of the previously coded transform coefficients can be used as the context for determining a probability model.

To encode a transform block, a video coding system may traverse the transform block in a scan order and encode (i.e., entropy encode) each transform coefficient as the transform coefficient is traversed (i.e., visited).

Figure 7:
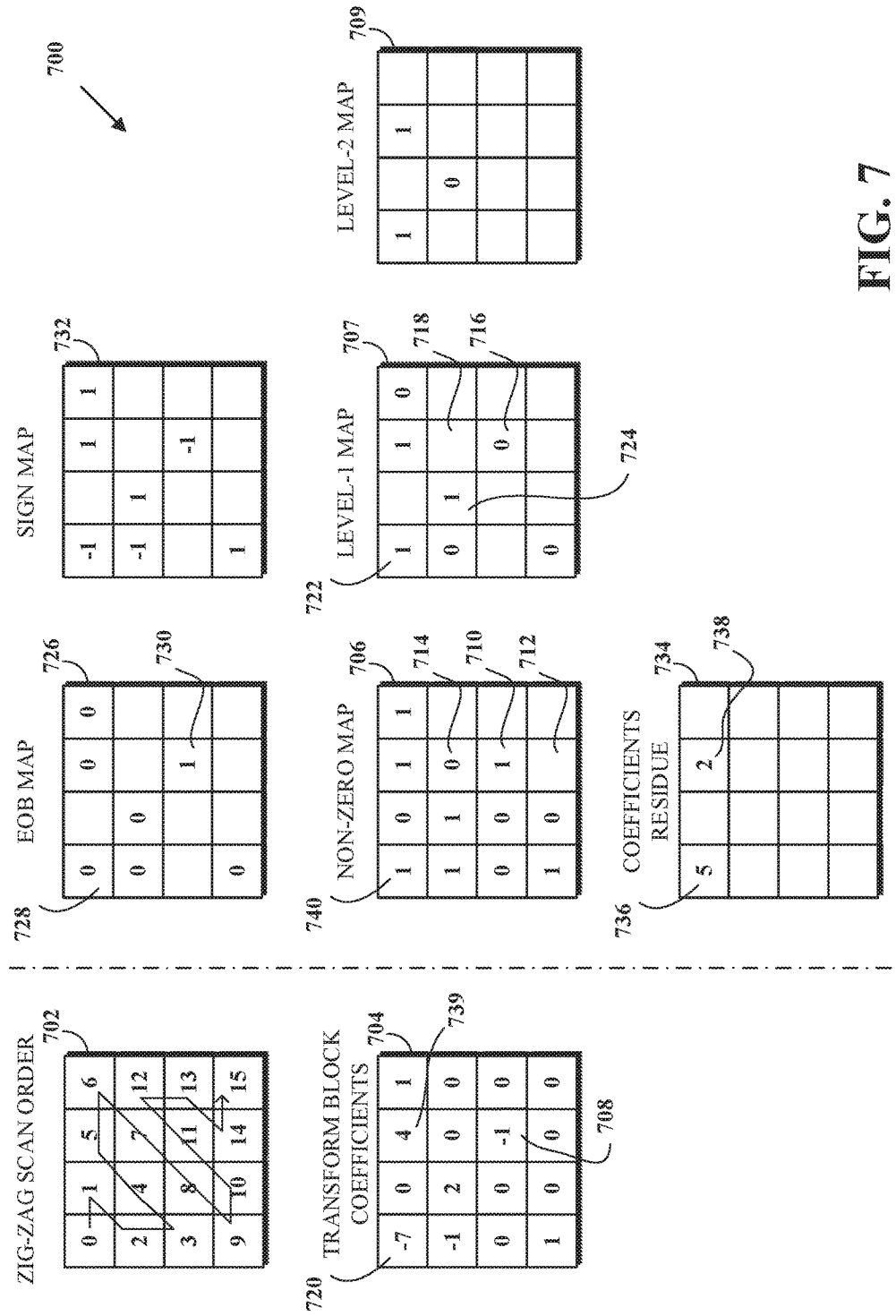
FIG. 7 is a diagram illustrating the stages of transform coefficient coding using level maps in accordance with implementations of this disclosure.

In a zig-zag scan order, the top left corner of the transform block (also known as the DC coefficient) is first traversed and encoded, the next coefficient in the scan order is traversed and encoded, and so on. A zig-zag scan order 702 is illustrated in FIG. 7. In the zig-zag scan order 702, some transform coefficients above and to the left of a current transform coefficient (i.e., a to-be-encoded transform coefficient) are traversed first. For example, for the transform coefficient at location 8, the coefficients at scan locations 0, 1, 2, 3, 4, 5, 6, and 7 are visited and, therefore, encoded before the transform at location 8 is encoded. At least some of the previously visited (i.e., previously encoded) transform coefficients can be used to determine the context model for the transform coefficient at location 8. The magnitudes of some of the above and left transform coefficients can be used as the context for determining a probability model for the transform coefficient at location 8. The magnitudes of transform coefficients are typically binarized (i.e., converted to a binary code) before encoding.

Using the binarized magnitude information of previously encoded transform coefficients may result in an impractically large number of context models to select from. The binarized magnitude of a quantized transform coefficient can be 0, 1, 2, . . . , $2^{15}$. As such a context model based on the combination of the immediately above and immediate left neighbors can have $2^{30}$ (i.e., $2^{15} \times 2^{15}$) different variations. Such a model is impractically large. In order to reduce the complexity, a simplified model, which discards the majority of the information by classifying contexts into several group, can be used. For example, the simplified model reduces the available contexts to five or six categories of contexts for the above neighbor and five or six for the left neighbor. As such, the $2^{30}$ contexts are reduced to 25 or 36 context categories. As such, a simplified model does not fully utilize the available information of the left and above neighbors which can result in compression performance loss during entropy coding. Additionally, the number of neighboring previously coded transform coefficients that can be used as context is limited.

Implementations of this disclosure can result in better compression of transform coefficients by utilizing more information from previously coded neighboring transform coefficients when encoding a transform coefficient.

A transform block is decomposed via a multi-run process into multiple level maps such that the level maps break down (i.e., reduce) the coding of each transform coefficient value into a series of binary decisions each corresponding to a magnitude level (i.e., a map level). As such, a transform coefficient of the transform block is decomposed into a series of level binaries and a residue according to the equation:

$$\text{coefficient}[r][c] = \left\{\left(\sum_{k=0}^{T} \text{level}_k[r][c]\right) + \text{residue}[r][c]\right\} * \text{sign}[r][c]$$

-continued

Where $\text{residue}[r][c] = \text{absolute}(\text{coefficient}[r][c]) - T$ $\text{sign}[r][c] = \begin{cases} 1 & \text{if coefficient}[r][c] > 0 \\ -1 & \text{if coefficient}[r][c] < 0 \end{cases}$ In the above equation, coefficient[r][c] is the transform coefficient of the transform block at the position (row=r, column=c), T is the maximum map level, $\text{level}_k$ is the level map corresponding to map level k, residue is a coefficient residual map, and sign is the sign map of the transform coefficients. These terms are further described below with respect to FIG. 7. The transform coefficients of a transform block can be re-composed using the same equation, such as by a decoder, from encoded $\text{level}_k$ maps, residual map residue, and sigh map sign.

A zeroth run determines a non-zero map (also referred to as a level-0 map) which indicates which transform coefficients of the transform block are zero and which are non-zero. Level maps corresponding to runs 1 through a maximum (i.e., threshold) level T (i.e., level-1 map, level-2 map, . . . , level-T map) are generated in ascending order from level 1 to the maximum map level T. The level map for level k, referred to as the level-k map, indicates which transform coefficients of the transform block have absolute values greater to or equal to k. The level maps are binary maps. A final run generates a coefficients residue map. If the transform block contains transform coefficient values above the maximum map level T, the coefficients residue map indicates the extent (i.e., residue) that these coefficients are greater than the maximum map level T.

When generating (i.e., coding) the level-k map, only the positions (r, c) corresponding to positions (r, c) of the level-(k−1) map which are equal to 1 (i.e., $\text{level}_{k-1}[r][c]=1$) need be processed—other positions of the level-(k−1) are determined to be less than k and, therefore, there is no need to process them for the level-k map. This reduces processing complexity and reduces the amount of binary coding operations.

As the level maps contain binary values, the above and left neighbors of a value to be encoded are binary values. A context model based on the binary values of any number of previously coded neighbors can be determined. The context model can fully utilize information from all these neighbors. The previously coded neighbors can be neighbors in the same level map or a preceding level map, such as an immediately preceding level map. The immediately preceding map of the level-k (e.g., level-2) map is the level-(k−1) (e.g., level-1) map. Contexts according to this disclosure can be less complex thereby resulting in efficient models for coding the level maps.

When encoding a level-k map, the fully coded level-(k−1) map and the partially coded level-k map are used as context information for context modeling. As compared to transform coefficient coding of other video systems, which code one coefficient value at a time before moving to next transform coefficient, implementations of this disclosure can reduce the cardinality of the reference sample set. This is so because, as further described herein, the information from the level-(k−1) map and partially coded level-k map are binary information. The binary information enables the use of sophisticated spatial neighboring templates for context modeling binary information. Such spatial neighboring templates can better capture statistical characteristics of transform blocks, especially those with larger transform block sizes.

In implementations of this disclosure, transform coefficient coding can be improved by fully utilizing the information of neighboring transform coefficients when determining a context for selecting a context model. Instead of selecting a context model based on simplified context categories, and as neighboring values are simple binary values, a more accurate context model can be determined when coding a transform coefficient. Other details are described herein after first describing an environment in which the disclosure may be implemented.

Transform coefficient coding using level maps is described herein first with reference to a system in which the teachings may be incorporated.

Figure 1:
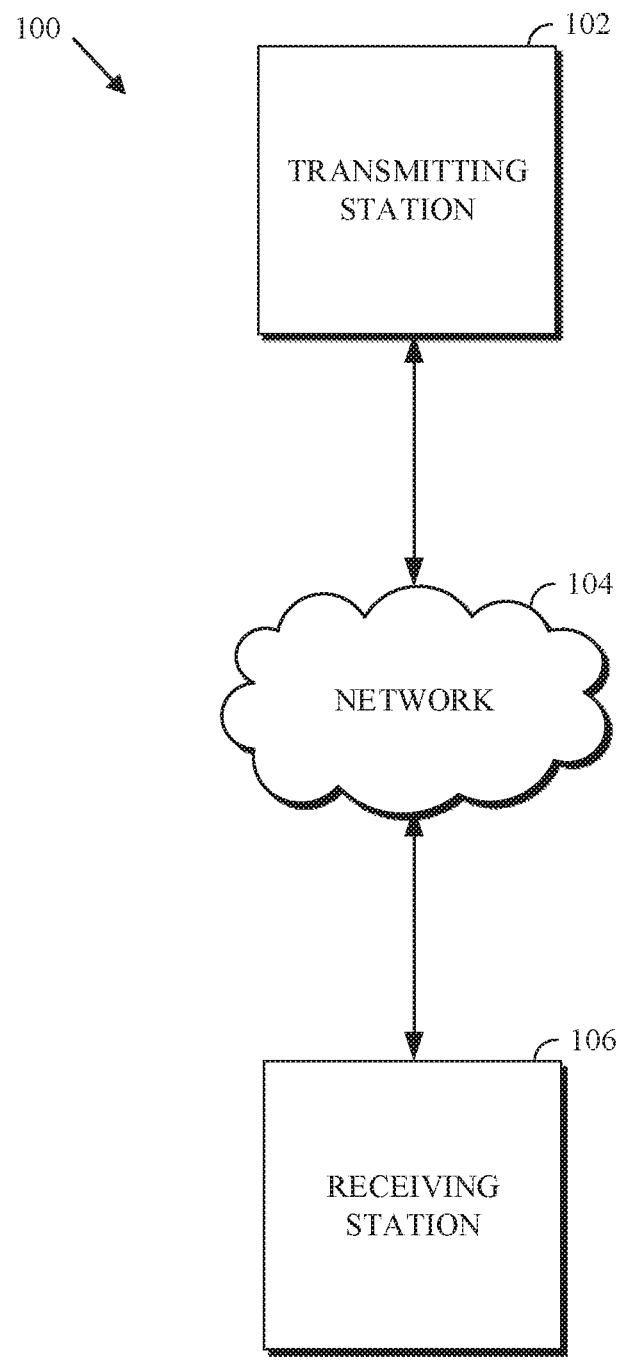
FIG. 1 is a schematic of a video encoding and decoding system.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
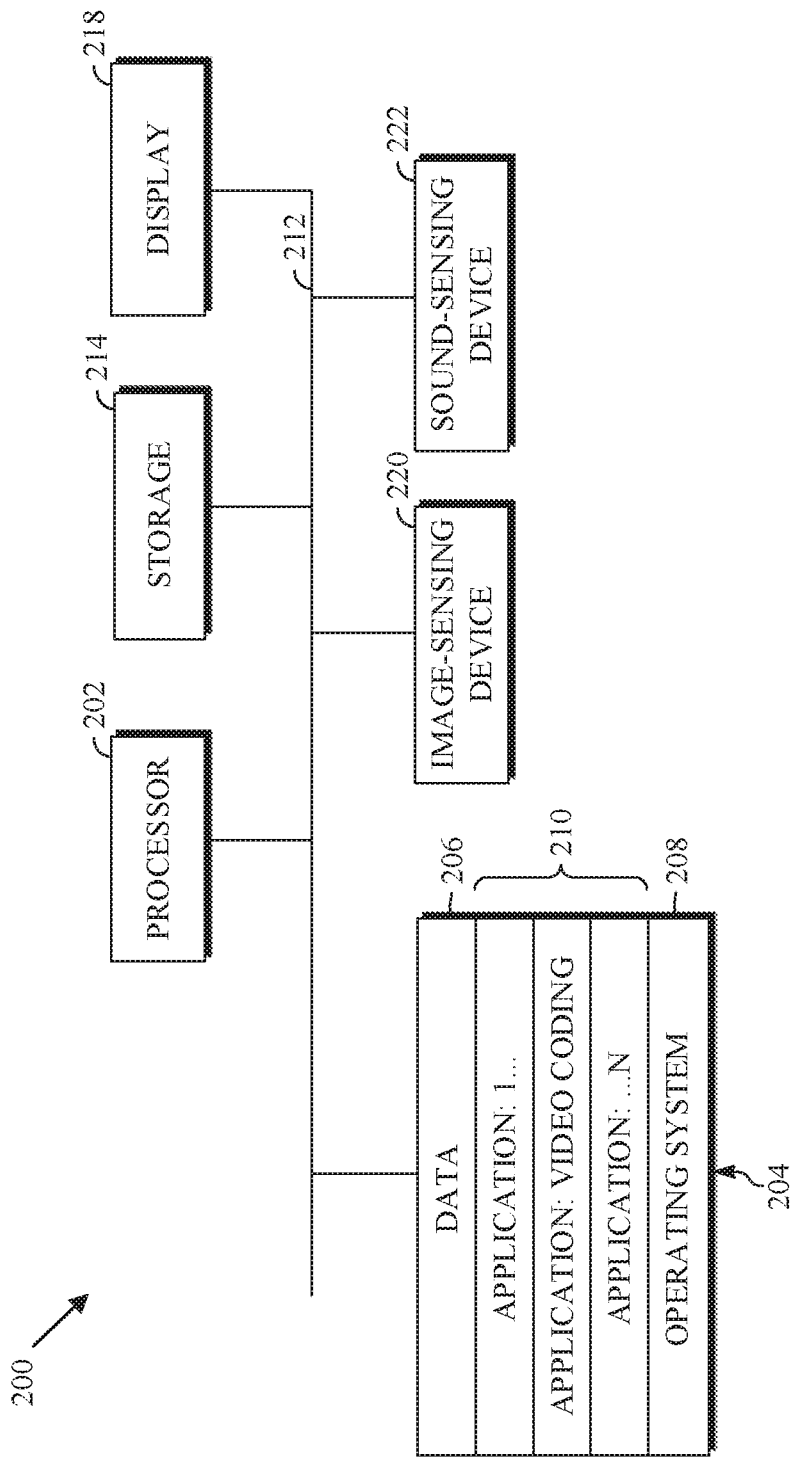
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
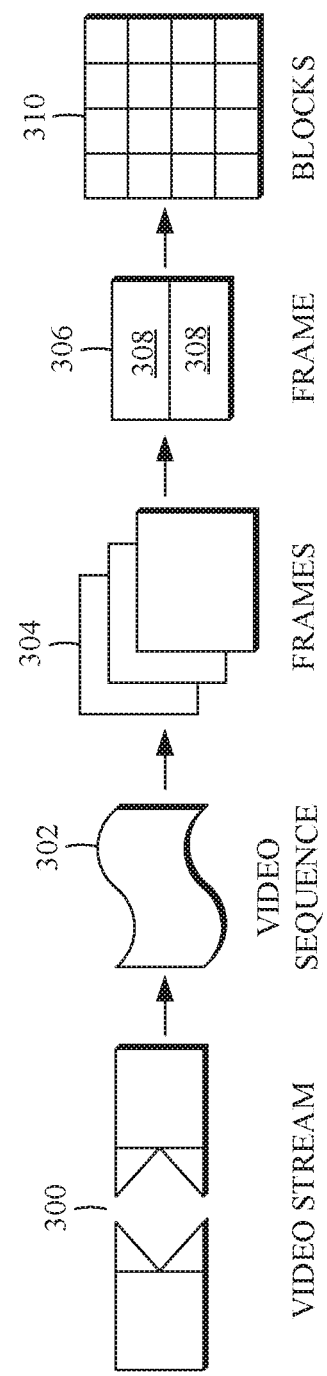
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
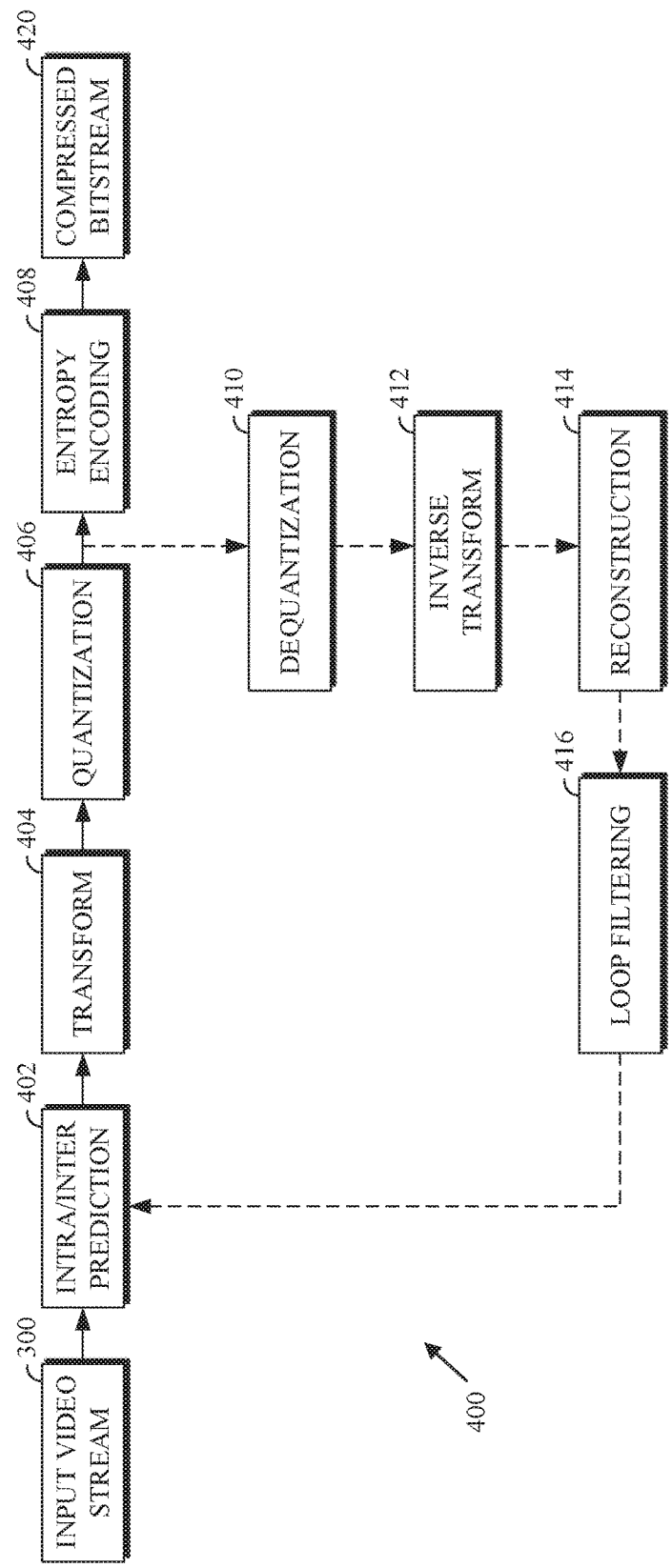
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
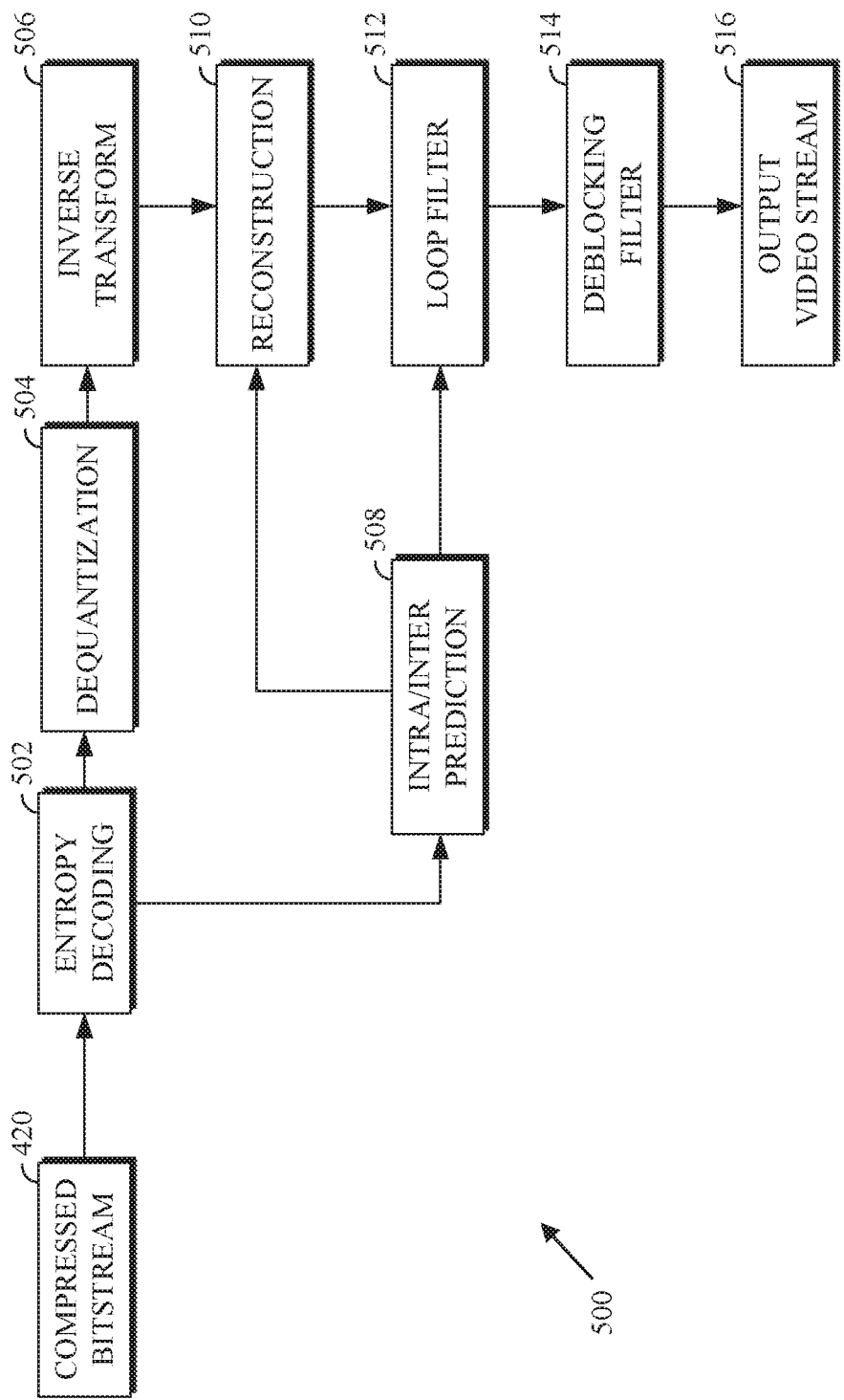
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 11 below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
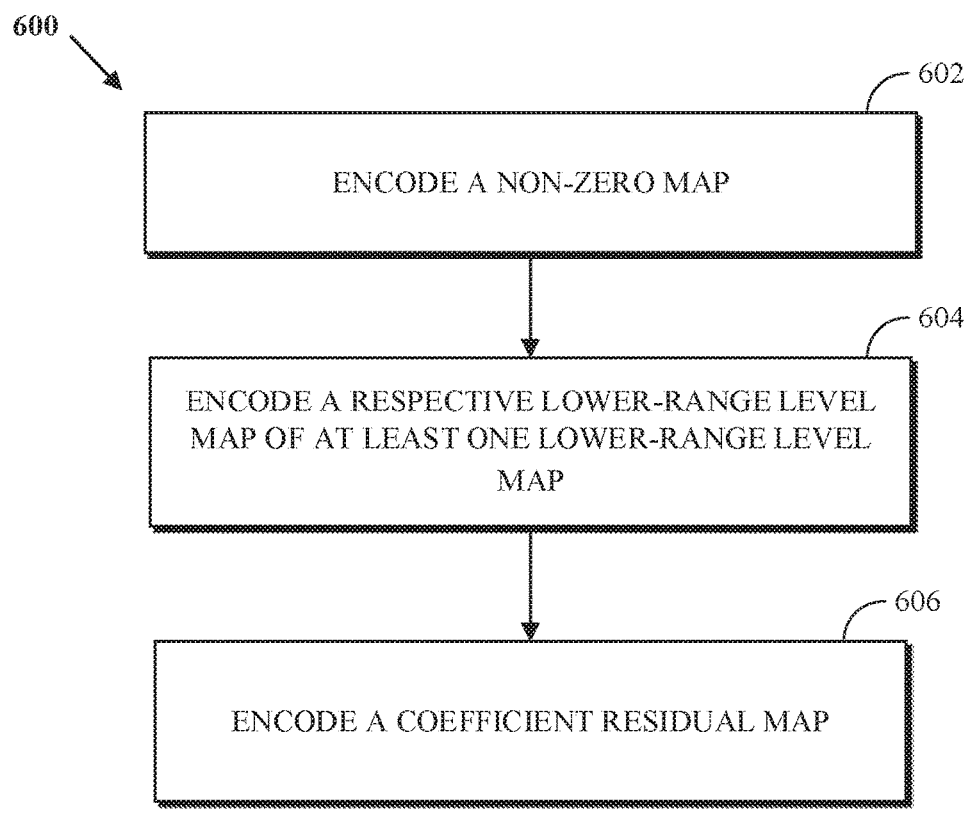
FIG. 6 is a flowchart diagram of a process for encoding a transform block in an encoded video bitstream according to an implementation of this disclosure.

FIG. 6 is a flowchart diagram of a process 600 for encoding a transform block in an encoded video bitstream according to an implementation of this disclosure. The process 600 can be implemented in an encoder such as the encoder 400. The encoded video bitstream can be the compressed bitstream 420 of FIG. 4.

The process 600 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 600. In at least some implementations, the process 600 can be performed in whole or in part by the entropy encoding stage 408 of the encoder 400.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 600 is now explained with reference to FIG. 7. FIG. 7 is a diagram illustrating the stages 700 of transform coefficient coding using level maps in accordance with implementations of this disclosure. FIG. 7 includes the zig-zag scan order 702, a transform block 704, a non-zero map 706, a level-1 map 707, a level-2 map 709, an end-of-block map 726, a sign map 732, and a coefficient residual map 734.

The process 600 can receive a transform block, such as the transform block 704 of FIG. 7. The transform can be received from the quantization step of an encoder, such as the quantization stage 406 of the encoder 400 of FIG. 4. The transform block 704 includes zero and non-zero transform coefficients. Some of the non-zero coefficients may be negative values.

At 602, a non-zero map is encoded. The non-zero map indicates positions of the transform block containing non-zero transform coefficients. The non-zero map can also be referred to as the level-0 map.

The non-zero map 706 of FIG. 6 illustrates a non-zero map. The non-zero map can be generated by traversing the transform block 704 in a scan order, such as the zig-zag scan order 702 of FIG. 7, and indicating in the non-zero map 706, using binary values, whether the corresponding transform coefficient is a zero or a non-zero. In the non-zero map 706, a non-zero transform coefficient of the transform block 704 is indicated with the binary value 1 (one) and a zero transform coefficient is indicated with the binary value 0 (zero). However, the indication can be reversed (i.e., a zero to indicate a non-zero transform coefficient and 1 (one) to indicate a zero transform coefficient).

In an implementation, zero transform coefficients that are beyond (i.e., come after) the last non-zero transform coefficient, based on the scan order of the transform block, are not indicated in the non-zero map. For example, using the zig-zag scan order 702 to scan the transform block 704, the last non-zero transform coefficient 708, corresponding to scan order location 11, is the last indicated transform coefficient in the non-zero map 706 at last non-zero coefficient 710. No values are indicated in the non-zero map 706 for the transform coefficients corresponding to the scan positions 12-15 of the zig-zag scan order 702.

At 604, the process 600 encodes a respective lower-range level map. Each lower-range map has a map level up to a maximum map level. A lower-range level map indicates which values of the non-zero transform coefficients are equal to the map level of the lower-range map and which values of the non-zero transform coefficients are greater than the map level.

For each map level k, up to the maximum map level T, a lower-range level map $level_k$ is encoded. Each lower-range level map indicates which values of the transform block are equal to the map level of the lower-range level map and which values of the transform block are greater than the map level. As such, the process 600, using multiple runs (i.e., each run corresponding to a level k=1, 2, . . . , T), breaks down the coding of transform coefficients into a series of binary decisions each corresponding to a magnitude level. The binary decision of a coefficient at row and column (r, c) in the transform block at level k can be defined by:

$level_k[r][c]=1$ if absolute(coefficient[r][c])>k

=0 if absolute(coefficient[r][c])<k

For example, for k=1 (i.e., for the level-1 map 707), the process 600 determines for each transform coefficient of the transform block 704 whether the absolute value of the transform coefficient is greater than k (i.e., 1) or less than k. For the transform coefficient 720 (i.e., at r=0, c=0), as the absolute value of −7 (i.e., |−7|=7) is greater than 1, the process 600 sets the corresponding value 722 of the level-1 map 707 to 1. For the last non-zero transform coefficient 708 (i.e., at r=2, c=2), as the absolute value of −1 (i.e., |−1|=1) is less than k (i.e., 1), the process 600 sets the corresponding value 716 of the level-1 map 707 to 0.

In an implementation, to generate a lower-level map, the process 600 can scan the preceding level map backwards starting at the last 1 value of the previous level map. For a level-k map, the preceding level map is the level-(k−1) map corresponding to the preceding map level (k−1). That is, for k=2, the preceding level map is the level-1 map. For k=1, the preceding level map is the level-0 map (i.e., the non-zero map). For the level-1 map 707, scanning of the non-zero map 706 starts at the last non-zero coefficient 710. For the level-2 map 709, scanning of the level-1 map 707 starts at the last non-zero coefficient 724. In generating a level-k map, the process 600 need only process the transform coefficients corresponding to 1 values in the level-(k−1). The process 600 need not process the transform coefficients corresponding to non 1 values as those values are already determined to either be equal to k−1 (i.e., the zero values of the level-(k−1) map) or are less then k−1 (i.e., the blank values of the level-(k−1) map).

In an implementation, the maximum map level T can be fixed. For example, the maximum map level T can be provided as a configuration to the process 600, the maximum map level T can be hard-coded in a program that implements the process 600, or the maximum map level T can be set statistically or adaptively based on previously coded transform blocks or other blocks of the encoded video bitstream. Alternatively, the maximum map level T is determined by the process 600. That is, the process 600 can test different values for the maximum map level T (i.e., T=1, 2, 3, 4, . . . ) and determine which value provides the best compression performance. The value of the maximum map level T that results in the best compression can be encoded in the video bitstream which a decoder, such as the decoder 500 of FIG. 5 can decode and use. A maximum map level T of 2 or 3 has been determined to provide acceptable compression as compared to other values for the maximum map level T.

At 606, the process 600 encodes a coefficient residual map. Each residual coefficient of the coefficient residual map corresponds to a respective (i.e., co-located) non-zero transform coefficient of the transform block having an absolute value exceeding the maximum map level. The residual coefficient for a transform coefficient at location (r, c) of the transform block can be calculated using the formula:

$$residue[r][c]=absolute(coefficient[r][c])-T \qquad (2)$$

FIG. 7 illustrates a coefficients residue map 734. In the example of FIG. 7, the maximum map level T is equal to 2. As such, the coefficients residue map 734 contains the residuals of the transform coefficients of the transform block 704 the absolute values of which are greater than 2. A residual coefficient is the extent to which the absolute value of a transform coefficient exceeds the maximum map level T. The absolute values of two values of the transform block 704 are greater than the value of the maximum map level T (i.e., 2), namely the transform coefficient 720 (i.e., |−7|=7>2) and transform coefficient 739 (i.e., |4|=4>2). Respectively, the coefficients residue map 734 includes residual 736 and residual 738. Using the equation (2), the residual 736 is set to 5 (i.e., absolute(−7)−2=5) and the residual 738 is set to 2 (i.e., absolute(4)−2=2).

The residual coefficients of the coefficients residue map 734 can be encoded in the encoded video bitstream using binary coding. A probability distribution that fits the statistics of the residual coefficients of the coefficients residue map can be used. The probability distribution can be a geometric distribution, a Laplacian distribution, a Pareto distribution, or any other distribution.

Encoding the residual coefficients in the encoded video bitstream provides several benefits, such as over video coding systems that encode the transform coefficients. As each residual coefficient is smaller in magnitude than its corresponding transform coefficient, less bits are required to encode the residual coefficient. Additionally, as there are fewer residual coefficients to encode (e.g., 2 in the coefficient residual map 734 of FIG. 7) than non-zero transform coefficients (e.g., 7 in the transform block 704 of FIG. 7), additional compression can result.

In an implementation of the process 600, a sign map can also be encoded. A sign map indicates which transform coefficients of the transform block have positive values and which transform coefficients have negative values. Transform coefficients that are zero need not be indicated in the sign map. The sign map 732 of FIG. 7 illustrates an example of a sign map for the transform block 704. In the sign map, negative transform coefficients are indicated with a −1 and positive transform coefficients are indicated with a 1.

In an implementation of the process 600, encoding a non-zero map, at 602, can also include generating an end-of-block map for the transform block and interleaving the non-zero map and the end-of-block map in the encoded video bitstream.

The end-of-block map indicates whether a nonzero transform coefficient of the transform block is the last non-zero coefficient with respect to a given scan order. If a non-zero coefficient is not the last non-zero coefficient in the transform block, then it can be indicated with the binary value 0 (zero) in the end-of-block map. If, on the other hand, a non-zero coefficient is the last non-zero coefficient in the transform block, then it can be indicated with the binary value 1 (one) in the end-of-block map.

For example, as the transform coefficient 720 of the transform block 704 is followed by another non-zero transform coefficient (e.g., the transform coefficient −1 corresponding to scan location 2), the transform coefficient 720 is not the last non-zero transform coefficient, it is indicated with the end-of-block value 728 of zero. On the other hand, as the transform coefficient corresponding to the scan location 11 (i.e., the last non-zero transform coefficient 708) is the last non-zero coefficient of the transform block 704, it is indicated with the end-of-block value 730 of 1 (one).

The process 600 can, by traversing the non-zero map and the end-of-block maps in a same scan order, interleave values from the non-zero map 706 and the end-of-block map 726 in the encoded bitstream. The process 600 can use the zig-zag scan order 702 or any arbitrary scan order. For each position (r, c), the value at that row and column of the non-zero map 706 (i.e., nz_map[r][c]) is coded first. If the value nz_map[r][c] is 1, then the corresponding value from the end-of-block map 726 (i.e., eob_map[r][c]) is coded next to indicate whether the position (r, c) of the transform block 704 contains the last nonzero transform coefficient. The process 600 ends the coding of the non-zero map (602 of the process 600) when eob_map[r][c] equals to 1 or when the last position in the transform block (e.g., the scan position 15 of the zig-zag scan order 702) is reached. That is, when encoding a value of 1 from the non-zero map 706, the value is followed by another syntax element (i.e., a value to be encoded in the encoded video bitstream) from a corresponding (i.e., co-located) end-of-block map 726 value to indicate whether the 1 value is the last 1 value of the non-zero map 706.

In an implementation, encoding a non-zero map, at 602, can also include determining a coding context for a value (i.e., to-be-coded value) of the non-zero map. The coding context of a to-be-coded value at a current position (r, c) can be based on previously coded non-zero neighboring values of the to-be-coded value in the non-zero map. The coding context can also be based on the position of the to-be-coded value within the non-zero map.

As mentioned above, the context information can be determined based on the number of non-zero previously coded neighbors of the current position and can be calculated using the sum $$\text{non\_zero\_map\_sum}(r,c) = \Sigma_{(r',c') \in nb(r,c)} nz\_\text{map}(r',c') \quad (1)$$

In equation 1, non_zero_map_sum(r, c) is the number of non-zero previously coded neighbors of the to-be-coded value of the non-zero block at position (r, c), nb(r,c) is the set of previously coded neighbors of the to-be-coded value at location (r,c) of the non-zero map, and nz_map(r', c') is the value at position (r', c') in the non-zero map. Equation (1) is further explained with reference to FIG. 8.

Figure 8:
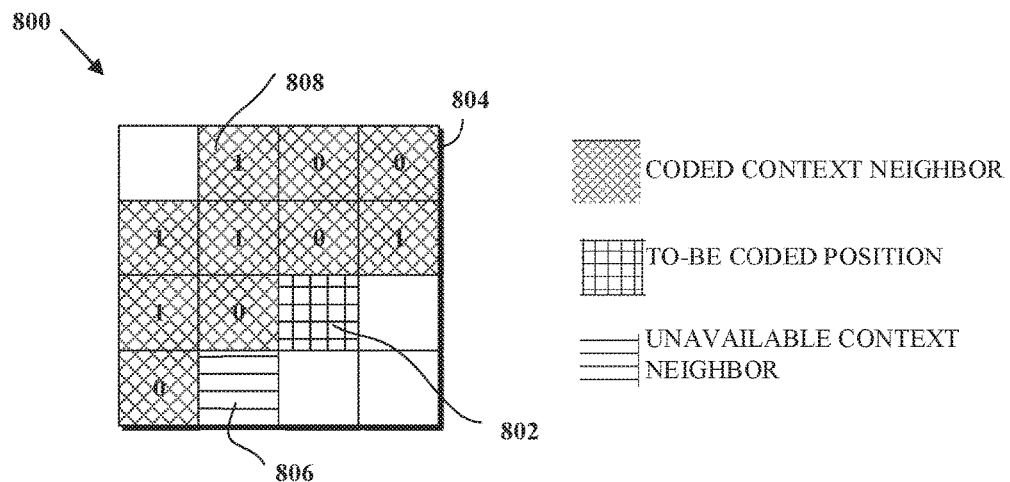
FIG. 8 is a diagram of previously coded neighbors in a non-zero map according to an implementation of this disclosure.

FIG. 8 is a diagram of previously coded neighbors in a non-zero map 800 according to an implementation of this disclosure. FIG. 8 includes a to-be-encoded value, current value 802, an unavailable context neighbor 806 (i.e., a neighboring value for which context information is not available), and coded context neighbors, such as coded context neighbor 808. Ten coded context neighbors are illustrated. Which values are included in the set of neighbors depends on the scan order. For example, using the zig-zag scan order 702 of FIG. 7, the set of neighbors illustrated in FIG. 8 includes the coded context neighbors 808 which includes neighbors that are above and to the left of the current value 802. For the current value 802, non_zero_map_sum(2,2)=5. This value (i.e., 5) can be used as context information to determine a probability model for coding the current value 802 of the non-zero map 800.

As indicated above, the coding context can also be based on the position of the to-be-coded value within the non-zero map or, equivalently, in the transform block. The positions of the transform block can be grouped into context groups. For example, four context groups can be set: a first group corresponding to the DC coefficient (i.e., r=0 and c=0), a second group corresponding to the top row except for the AC coefficient (i.e., r=0 and c>0), a third group corresponding to the left-most column except for the AC coefficient (i.e., r>0 and c=0), and a fourth group corresponding to all other coefficients (i.e., r>0 and c>0). As such, the current value 802 corresponds to the fourth context group.

As explained above, determining a context model for coding a value of the non-zero map can be based on two factors: neighboring information as explained with respect to FIG. 8 and the relative position of the value to be encoded with respect to the transform block—that is, with respect to the frequencies of the transform block and the context group is corresponds to. A non_zero_map_sum value is assigned a different context model depending on the context group of the current value. That is, the two factors can be combined by 1) calculating a non_zero_map_sum value, 2) identifying the context group, and 3) determining (i.e., via lookup) a context model within the context group based on the non_zero_map_sum value.

In an implementation, encoding a non-zero map, at 602, can also include determining a coding context for each value of the end-of-block map. The process 600 can determine a context model for a to-be-encoded value of the end-of-block map based on the location of the to-be-encoded value with respect to the frequency information of the transform block. That is, the position of the transform coefficient in the transform block can be used as the context for determining the context model for encoding a corresponding (i.e., co-located) to-be-encoded value of the end-of-block map. The transform block can be partitioned into areas such that each area corresponds to a context. The partitioning can be based on the rationale that the likelihood is very low that the end-of-block is at the DC location of the transform block but that the likelihood increases further from the DC coefficient. The process 600 can determine a context model as described with respect to FIG. 9.

Figure 9:
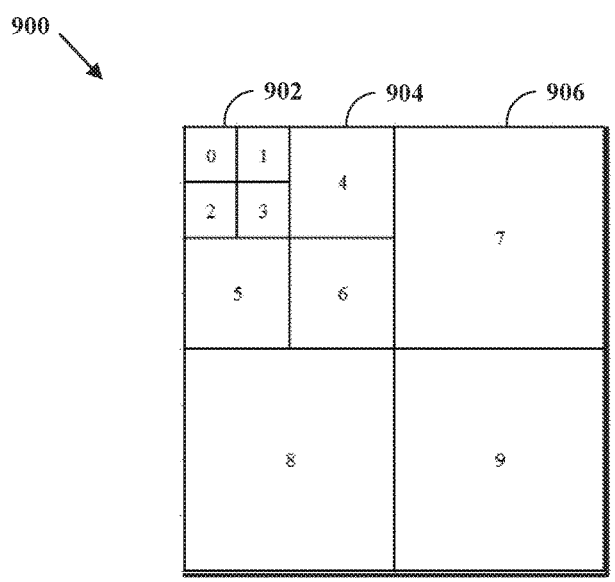
FIG. 9 is a diagram of an example of frequency locations for determining context models for encoding an end-of-block map according to an implementation of this disclosure.

FIG. 9 is a diagram of an example of frequency locations 900 for determining context models for encoding an end-of-block map according to an implementation of this disclosure. FIG. 9 illustrates an 8×8 transform block that is partitioned into 9 contexts. Each of contexts 0, 1, 2, and 3 corresponds to a 1×1 area of the transform block; each of contexts 4, 5, and 6 corresponds to a 2×2 area of the transform block; and each of contexts 7, 8, and 9 corresponds to a 4×4 area of the transform block. Other transform block sizes and context partitions are also possible.

Referring now to FIG. 9 and the end-of-block map 726 of FIG. 7 together. First it is to be noted that the end-of-block map 726 and the corresponding transform block 704 are 4×4 blocks whereas the frequency locations 900 corresponds to an 8×8 transform block. As such, only the contexts 0-6 of the frequency locations 900 can be used with the end-of-block map 726. The end-of-block value 730 falls within the context 6 of the frequency locations 900. As such, the process 600 assigns the context model corresponding to the context 6 to the end-of-block-value 730. The end-of-block value 728 of the end-of-block map 726 falls within the context 2 of the frequency locations 900 of FIG. 9. As such, the process 600 assigns the context model corresponding to the context 2 to the end-of-block value 728. Each context can have its own context model. Each context model can be adapted to the video signal, or portions of the video signal, of a video stream, such as the video stream 300 of FIG. 3, being processed. That is, the context models can be updated as video frames or blocks are processed. For example, the context models of some of the contexts can be updated after each frame or blocks of frames are processed.

In some implementations, the non-zero map can be a binary map having dimensions corresponding to the transform block. A position of the non-zero map can be set to a value of one (1) when the corresponding (i.e., co-located) transform coefficient is a non-zero transform coefficient (i.e., the transform coefficient is not equal to zero). A position of the non-zero map can be set to a value of zero when the corresponding transform coefficient has a value of zero and is before a last non-zero coefficient in a scan order of the transform block. A position of the non-zero map can be set to no entry when a corresponding transform coefficient has a value of zero and is after the last non-zero coefficient in the scan order of the transform block.

In some implementations, a lower-range level map can be a binary map having dimensions corresponding to the dimensions of the transform block and, as indicated above, a map level k. A position of the lower-range level map can be set to one (1) when a corresponding value in the preceding level map (i.e., level map k−1 as described below) is one (1) and the corresponding transform coefficient is greater than the map level k of the lower-range level map. A position of the lower-range level map can be set to a value of zero when a corresponding value in the preceding level map has a value of one and the corresponding transform coefficient is equal to the map level k of the lower-range level map. A position of the lower-range level map can have no value when a corresponding value in the preceding level map has a value of zero.

In an implementation of the process 600, encoding a lower-range level map for a level, at 604, can also include determining, based on a scan order of the lower-range level map, a level-map coding context for a value of the lower-range level map. As indicated above, encoding a value of a lower-range level map k amount to encoding a binary value, namely whether the corresponding (i.e., co-located) transform coefficient of the transform block is equal k or is above k. The encoding of binary values results in simple contexts. As such, multiple neighboring values of a value can be used as the context for determining a context model for the value.

As also indicated above, scanning of the lower-range level map can proceed in a backwards scan order. As such, when encoding a value, neighboring values below and to the right of the to-be-encoded value (if, for example, the scan order is the zig-zag scan order or 702 of FIG. 7) will have already been encoded. Therefore, first neighboring values (e.g., below and right neighboring values) in the lower-range level map can be used as context. Additionally, second neighboring values (e.g., top and left neighboring values) in the immediately preceding level-(k−1) map can also be used as context. The preceding level map of a lower-range level-k map is the lower-range level-(k−1) map, for k>2; and the preceding level map for the level-1 map is the non-zero map.

In an implementation, to construct context information for a lower-range value at position (r, c) of the lower-range level-k map, the neighbor sum of the position (r, c) in the level-(k−1) map is calculated first. Then a neighbor-triggered value in the lower-range level-k map is calculated. The neighbor-triggered value can be set by checking whether the position (r, c) has any coded neighbor with a value of 1 in the lower-range level-k map. Neighbors can be selected in a number of ways. FIG. 10, described below, provides non-limiting examples.

Figure 10A:
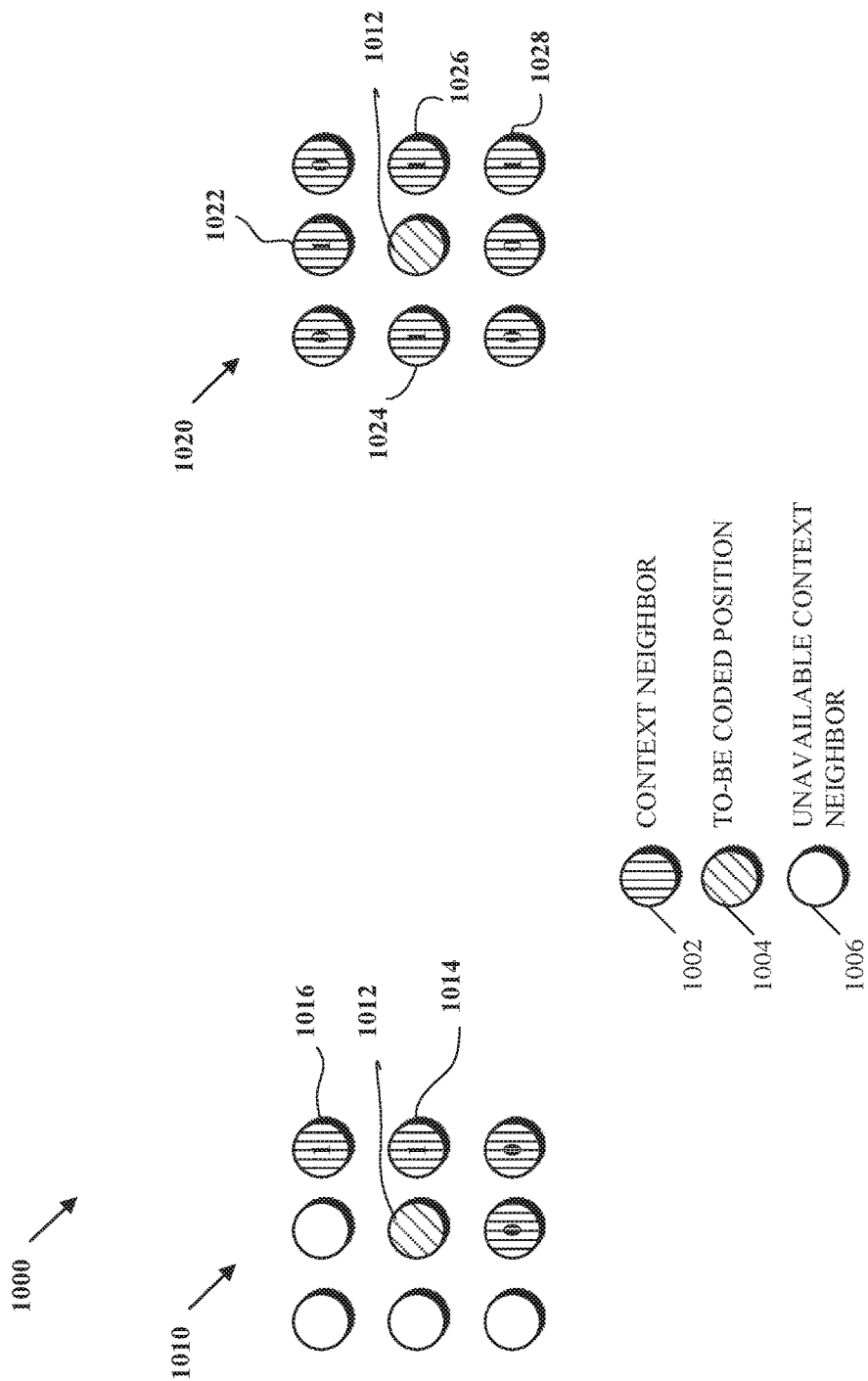
FIG. 10A is a diagram of an example of square context neighbors according to an implementation of this disclosure.

Any number of ways can be used to determine the context neighbors for the coding of a lower range level-k map. FIG. 10A is a diagram of an example 1000 of square context neighbors according to an implementation of this disclosure; and FIG. 10B is a diagram of an example 1050 of diamond context neighbors according to an implementation of this disclosure.

Figure 10B:
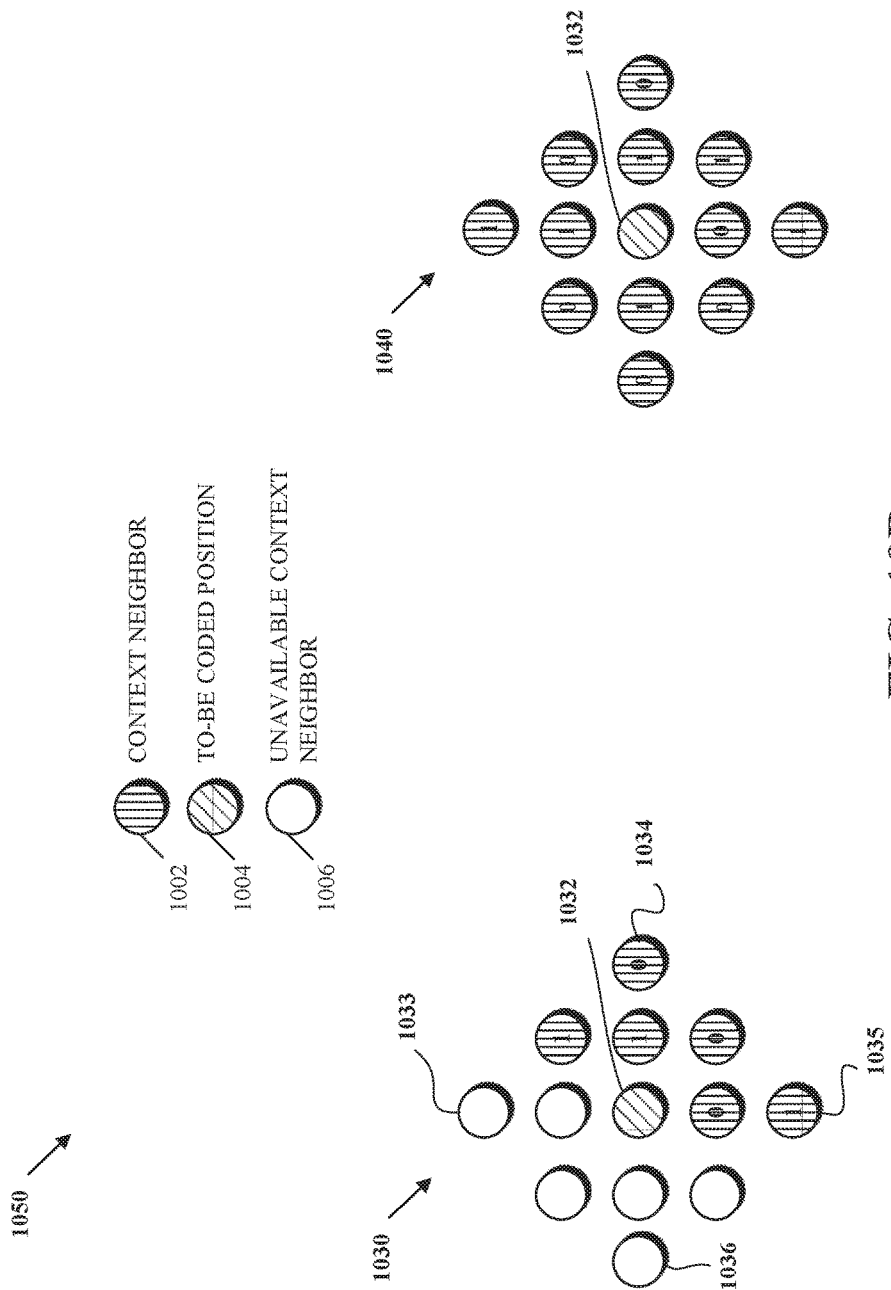
FIG. 10B is a diagram of an example of diamond context neighbors according to an implementation of this disclosure.

In FIGS. 10A-10B, values (i.e., circles representing values of a level map) shaded using the pattern 1004 are to-be-coded values; the values shaded with the pattern 1002 are values for which context information are available because these values are coded before a to-be-coded value; and the values shaded with the pattern 1006 are values for which context information are not available because these values are not coded before the to-be-coded values.

FIG. 10A includes a level-k neighbors 1010, a level-(k−1) neighbors 1020, and a to-be-coded value 1012. In the example 1000, eight (8) neighbors for each of the to-be-coded value 1012 are used. For the square context neighbors, any position that falls within a 3×3 block centered at the position of the to-be-coded value can be considered a neighbor.

The values shaded with the pattern 1002 of the level-k neighbors 1010 can constitute the first neighboring values for determining a context for the to-be-coded value 1012. A neighbor-triggered value, level_k_neighbor_trigger, as described above, is calculated to indicate whether at least one neighbor of the to-be-coded value is 1. In the level-k neighbors 1010, two neighbors have each a value of 1, namely value 1014 and value 1016. Accordingly, a level_k_neighbor_trigger value for the to-be-coded value 1012 is set to 1. In an another implementation, a total number of neighbors having a value of 1 can be calculated.

The values shaded with the pattern 1002 of the level-(k−1) neighbors 1020 can constitute the second neighboring values for determining a context for the to-be-coded value 1012. It is to be understood that the to-be-coded value 1012 illustrated the level-(k−1) neighbors 1020 is not, per se, the value to be encoded; rather it indicates the position of the level-(k−1) neighbors co-located at the same position as the to-be-coded value 1012 of the level-k neighbors 1010. Using the values of the level-(k−1) neighbors, a level-(k−1)_number_sum(r,c) can be calculated to indicate the total number of neighbors which have a value of 1. In this case, level-(k−1)_number_sum(r,c) is equal to 4 (namely, the values 1022, 1024, 1026, and 1028). When calculating level_k_neighbor_trigger and the level-(k−1)_number_sum, if a value for a neighbor is not available, the value can be considered to be zero.

As described above, the level_k_neighbor_trigger and the level-(k−1)_number_sum values are combined with the context group value for the to-be-coded value 1012 to determine a context model for coding the to-be-coded value 1012.

Turning now to FIG. 10B to illustrate the diamond context neighbors. FIG. 10B includes a level-k neighbors 1030, a level-(k−1) neighbors 1040, and a to-be-encoded value 1032. In the example 1050, twelve (12) neighbors for the to-be-coded value 1032 are used. The diamond context neighbors can be formed using the same 3×3 block centered at the to-be-coded position 1032 as the neighbors described for the to-be-coded value 1012 of FIG. 10A with four (4) additional relative positions; namely the position 1033 at (−2, 0), the position 1034 at (0, +2), the position 1035 at (+2, 0), and the position 1036 at (0, −2). These four additional positions are used as they have been determined to be correlated to the transform coefficient at to-be-coded position in the quantized transform block. Calculating level_k_neighbor_trigger and the level-(k−1)_number_sum and determining a context model can proceed as indicated with respect to FIG. 10A.

The coding context of values of a lower-range level-k map can further be based on the position, within the lower-range level map, of the to-be-encoded level-k map value. The positions of the transform block can be grouped into context groups. For example, four context groups can be set: a first group corresponding to the DC coefficient (i.e., r=0 and c=0), a second group corresponding to the top row except for the DC coefficient (i.e., r=0 and c>0), a third group corresponding to the left-most column except for the DC coefficient (i.e., r>0 and c=0), and a fourth group corresponding to all other coefficients (i.e., r>0 and c>0).

Accordingly, a context model for a to-be-encoded value of a lower-range map is selected by combining the neighboring information in the lower-range level-k map as described with respect to FIGS. 10A-10B, the neighboring information in the level-(k−1) map as described with respect to FIGS. 10A-10B, and the context group which is based on the location of a to-be-encoded value of the lower-range level-k map.

In an implementation, the process 600 can encode the non-zero map 706 and the end-of-block map 726 in a first phase, encode the level-k maps (e.g., the level-1 map 707 and the level-2 map 709) in a second phase, encode the coefficient residual map 734 in a third phase, and encode the sign map 732 in a fourth phase.

Figure 11:
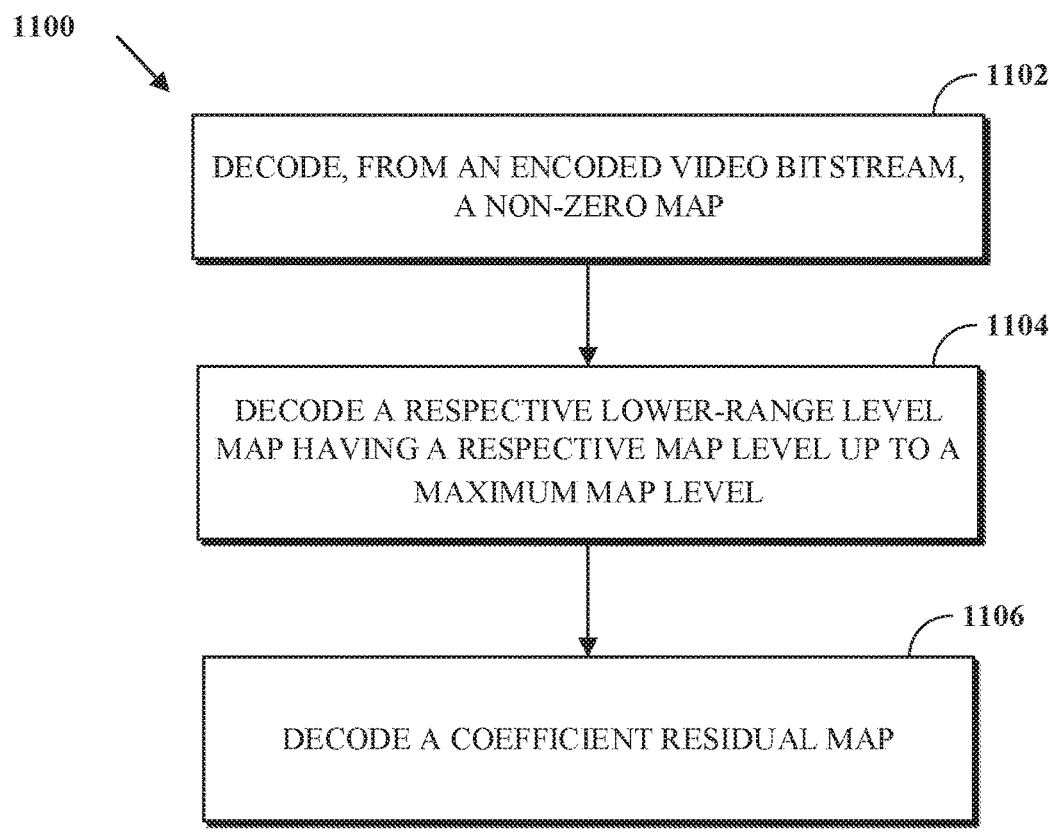
FIG. 11 is a flowchart diagram of a process for decoding a transform block from an encoded video bitstream according to an implementation of this disclosure.

FIG. 11 is a flowchart diagram of a process 1100 for decoding a transform block from an encoded video bitstream according to an implementation of this disclosure. The process 1100 may be performed by a decoder such as the decoder 500. For example, the process 1100 can be performed in whole or in part by the entropy decoding stage 502 of the decoder 500 and the encoded video bitstream can be the compressed bitstream 420 of FIG. 5. Implementations of the process 1100 can be performed by storing instructions in a memory such as the memory 204 of the receiving station 106 to be executed by a processor such as CPU 202, for example.

The process 1100 can be implemented using specialized hardware or firmware. Some computing devices can have multiple memories, multiple processors, or both. The steps or operations of the process 1100 can be distributed using different processors, memories, or both. For simplicity of explanation, the process 1100 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

The process 1100 is a multi-run process of binary decoding which recomposes (i.e., reconstructs) the transform block decomposed and encoded in the encoded video bitstream such as by an encoder implementing the process 600 of FIG. 6. The process 1100 includes, at 1102, decoding a non-zero map from the encoded video bitstream; at 1104, decoding a respective lower-range level map having a respective map level up to a maximum map level; and, at 1106, decoding a coefficient residual map of residual coefficients.

At 1102, the process 1100 decodes, from the encoded video bitstream, a non-zero map. The non-zero map indicates which transform coefficients of a transform block have a zero value and which transform coefficients of the transform block have a non-zero value. At 1102, the process 1100 decodes and generates a non-zero map that is equivalent to the non-zero map 706 of FIG. 7. First, the process 1100 reads a non-zero map value corresponding to the DC coefficient of the transform block. The DC coefficient is the top left corner of the transform block, such as the transform coefficient 720 of FIG. 7. That is, the process 1100 decodes the value 740 of FIG. 7 from the encoded bitstream. The process 1100 determines whether the value is a zero or a one, reads the next value from the encoded bitstream, determines whether the value is a zero or a one, and so until a non-zero map equivalent to the non-zero map 706 of FIG. 7 is reconstructed by the process 1100. The non-zero map indicates which transform coefficients of the transform block are non-zero.

At 1104, the process 1100 decodes a respective lower-range level map having a respective map level up to a maximum map level T. A lower-range level map having to a map level indicates which transform coefficients of the transform block are equal to the respective map level and which transform coefficients of the transform block are greater than the respective map level. At 1104, the process 1100 decodes values from the encoded video bitstream to reconstruct lower-range level-k maps encoded as described with respect to 604 of the process 600.

For example, to reconstruct a level-1 map, the process 1100 starts from the highest non-zero transform coefficient traversing backwards to determine which of transform coefficients are equal to 1 and which are greater than 1. That is, using the reconstructed non-zero map of the non-zero map 706 of FIG. 7, and starting at the last non-zero coefficient 710 and traversing backwards to the value 740, the process 1100 reconstructs the level-1 map 707 of FIG. 7. For each 1 value of the reconstructed non-zero map, the process 1100 decodes a value from the encoded video bitstream and reconstructs the level-1 map 707. The values decoded by the process 1100 are zero and one (1) values.

To reconstruct a level-2 map, the process 1100 uses the same procedure as that used to generate the level-1 map except that, instead of traversing the reconstructed non-zero map, the process 1100 uses the reconstructed level-1 map. The process 1100 repeats all the steps until the maximum map level number of level maps are reconstructed.

In an implementation, the process 1100 and the process 600 of FIG. 6 use the same maximum map level T. For example, the maximum map level T can be provided to the process 1100 as a configuration. In another implementation, the maximum map level T is signaled by the process 600 to the process 1100 in the encoded video bitstream. As such, the process 1100 decodes the maximum map level T from the encoded video bitstream.

At 1106, the process 1100 decodes a coefficient residual map. Each residual coefficient of the coefficient residual map corresponds to a respective transform coefficient of the transform block having an absolute value that exceeds the maximum map level. At 1106, the process 1100 reconstructs, e.g., the coefficient residual map 734 of FIG. 7. For each one (1) value of the level-T map, the process 1100 decodes a corresponding residual value from the encoded bitstream to reconstruct the coefficient residual map 734 of FIG. 7.

In an implementation of the process 1100, decoding a non-zero map, at 1102, can include decoding an end-of-block map for the transform block, wherein values of the end-of-block map are interleaved with values of the non-zero map. Values of the end-of-block map and values of the non-zero map can be interleaved as described above with respect to process 600. As such, the process 1100 decodes a value for the non-zero map. If the decoded value is 1, then the process 1100 decodes, from the encoded video bitstream, a value for the end-of-block map to indicate whether the decoded non-zero map value is the last non-zero value of the non-zero block. If the decoded non-zero value is not the last non-zero value, per the decoded end-of-block value, then the process 1100 decodes another non-zero map value and so on. The process 1100 repeats these steps until a decoded end-of-block value is indicated or until the last position in the transform block is reached.

In an implementation of the process 1100, decoding a non-zero map includes determining a first coding context for a to-be-decoded value of the non-zero map. The first coding context can be based on previously decoded non-zero neighboring values, in the non-zero map, of the to-be-decoded value. The first coding context can be further based on a position of the to-be-decoded value within the non-zero map. The first coding context can be determined as described above with respect to the process 600 of FIG. 6.

Decoding a lower-range level can include determining, based on a scan order of the lower-range level map, a coding context for a to-be-decoded value of the lower-range level map based on first neighboring values in the lower-range level map and second neighboring values in the immediately preceding lower-range level map. The coding context for the to-be-decoded value of the lower-range level map can be determined as described above with respect to the process 600 of FIG. 6.

Another implementation of this disclosure is a method for decoding a transform block from an encoded video bitstream. The method includes re-composing transform coefficients of the transform block from binary level maps arranged in a tier and a residual transform map reconstructed from the encoded video bitstream. The binary level maps are formed by breaking down a value of a respective transform coefficient into a series of binary decisions. Each binary decision corresponds to a magnitude level of the respective transform coefficient at a map level of a respective tier. The residual transform map includes values of the respective transform coefficients exceeding a cardinality of the binary level maps. The cardinality of the binary level maps can be decoded from the encoded video bitstream.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method of encoding a transform block in an encoded video bitstream, comprising:
encoding a non-zero map indicating positions of the transform block containing non-zero transform coefficients;
encoding lower-range level maps, each having a respective map level up to a maximum map level and indicating which values of the non-zero transform coefficients are equal to the respective map level of the each lower-range level map and which values of the non-zero transform coefficients are greater than the respective map level,
wherein the lower level maps including:
a first lower-range level map having a first map level of (k−1); and
a second lower-range level map having a second map level of k; and
wherein the encoding the second lower-range level map having the second map level of k comprising:
selecting a coding context for a to-be-encoded-value of the second lower-range level map, the to-be-encoded-value being at a scan order location in a scan order, the coding context selected using:
first neighboring values in the second lower-range level map having the second map level of k, the first neighboring values being values that precede the to-be-encoded-value in the scan order of the second lower-range level map; and
second neighboring values in the first lower-range level map having the first map level of (k−1), the second neighboring values including values that precede and values that follow, in the scan order, a co-located value of the to-be-encoded-value; and
encoding the to-be-encoded-value using the coding context; and
encoding a coefficient residual map, each residual coefficient of the coefficient residual map corresponding to a respective non-zero transform coefficient of the transform block having an absolute value exceeding the maximum map level.

2. The method of claim 1, wherein encoding the non-zero map comprises:
generating an end-of-block map for the transform block; and
interleaving the non-zero map and the end-of-block map in the encoded video bitstream.

3. The method of claim 2, wherein encoding the non-zero map further comprises:
determining a first coding context for a value of the non-zero map, the coding context based on previously coded non-zero neighboring values, in the non-zero map, of the value.

4. The method of claim 3, wherein the coding context is further based on a position of the value in the non-zero map.

5. The method of claim 1, wherein:
a lower-range level map of the lower level maps includes values only for positions having respective values of an immediately preceding lower-range level map, the immediately preceding lower-range level map corresponding to a preceding map level,
the respective values of the immediately preceding lower-range level map indicate respective values of the non-zero transform coefficients that are greater than the preceding map level, and
the immediately preceding lower-range level map is the non-zero map when the respective lower-range level map has a map level of 1.

6. The method of claim 1, wherein:
the maximum map level comprises at least a value of two,
the non-zero map is a binary map having dimensions corresponding to the transform block, each position of the non-zero map comprising one of a value of one when a corresponding transform coefficient is one of the non-zero transform coefficients, a value of zero when a corresponding transform coefficient has a value of zero and is before a last non-zero coefficient in a scan order of the transform block, or no entry when a corresponding transform coefficient has a value of zero and is after the last non-zero coefficient in the scan order of the transform block,
the first lower-range level map is a binary map having the dimensions and a map level of one, each position of the first lower-range level map comprising one of a value of one when a corresponding value in the non-zero map is one and the corresponding transform coefficient is greater than the map level of the first lower-range level map, a value of zero when a corresponding value in the non-zero map has a value of one and the corresponding transform coefficient is equal to the map level of the first lower-range level map, or no value when a corresponding value in the non-zero map has a value of zero, and
the second lower-range level map is a binary map having the dimensions and a map level of two, each position of the second lower-range level map comprising one of a value of one when a corresponding value in the first lower-range level map is one and the corresponding transform coefficient is greater than the map level of the second lower-range level map, a value of zero when a corresponding value in the first lower-range level map has a value of one and the corresponding transform coefficient is equal to the map level of the second lower-range level map, or no value when a corresponding value in the first lower-range level map has a value of zero.

7. The method of claim 6, further comprising:
encoding the maximum map level, values of the non-zero map, values of the first lower-range level map, and values of the second lower-range level map.

8. An apparatus for decoding a transform block from an encoded video bitstream, the apparatus comprising:
a processor; and
a memory including instructions executable by the processor to:
decode, from the encoded video bitstream, lower-range level maps, each having a respective map level up to a maximum map level and indicating which transform coefficients of the transform block are equal to the respective map level and which transform coefficients of the transform block are greater than the respective map level,
wherein the lower level maps including:
a first lower-range level map having a first map level of (k−1); and
a second lower-range level map having a second map level of k; and wherein to decode the second lower-range level map having the second map level of k comprises to:
    select a coding context for a to-be-decoded-value of the second lower-range level map, the to-be-decoded-value being at a scan order location in a scan order, the coding context selected using:
        first neighboring values in the second lower-range level map having the second map level of k, the first neighboring values being values that precede the to-be-decoded-value in the scan order of the second lower-range level map; and
        second neighboring values in the first lower-range level map having the first map level of (k−1), the second neighboring values including values that precede and values that follow, in the scan order, a co-located value of the to-be-decoded-value; and decode the to-be-decoded-value using the coding context.

9. The apparatus of claim 8, wherein the instructions further comprise instructions to:
    decode, from the encoded video bitstream, a non-zero map indicating which transform coefficients of the transform block have a zero value and which transform coefficients of the transform block have a non-zero value; and
    decode an end-of-block map for the transform block, wherein values of the end-of-block map are interleaved with values of the non-zero map.

10. The apparatus of claim 9, wherein the instructions to decode the non-zero map comprise instructions to:
    determine a first coding context for a value of the non-zero map, the first coding context based on previously decoded non-zero neighboring values, in the non-zero map, of the value.

11. The apparatus of claim 10, wherein the first coding context is further based on a position of the value within the non-zero map.

12. The apparatus of claim 9, wherein:
    a lower-range level map includes values only for positions having respective values of an immediately preceding lower-range level map, the immediately preceding lower-range level map corresponding to a preceding map level,
    the respective values of the immediately preceding lower-range level map indicate respective values of transform coefficients of the transform block that are greater than the preceding map level, and
    the immediately preceding lower-range level map is the non-zero map when the respective lower-range level map is a first lower-range level map.

13. The apparatus of claim 8, wherein the instructions to decode a coefficient residual map comprises instructions to:
    decode a residual coefficient of the coefficient residual map using a geometric distribution.

14. A method for decoding a transform block from an encoded video bitstream, the method comprising:
    re-composing transform coefficients of the transform block from binary level maps arranged in a tier and a residual transform map reconstructed from the encoded video bitstream, the binary level maps formed by breaking down a value of a respective transform coefficient into a series of binary decisions, each binary decision corresponding to a magnitude level of the respective transform coefficient at a map level of a respective tier, and the residual transform map including values of the respective transform coefficients exceeding a cardinality of the binary level maps; and
    decoding, using a context model, a to-be-decoded binary decision that is at a scan location in a scan order, the to-be-decoded binary decision being a value of a binary level map at a level k,
        wherein the context model is selected using:
            first neighboring binary decisions of the binary level map at a level k that precede the to-be-decoded binary decision; and
            second neighboring binary decisions of a binary level map at a level (k−1), the second neighboring binary decisions including values that precede and values that follow, in the scan order, a co-located binary decision of the to-be-decoded binary decision.

15. The method of claim 14, wherein the cardinality of the binary level maps is decoded from the encoded video bitstream.

* * * * *